Sept. 5, 1939.   E. M. LOWRY   2,172,249
PHOTOGRAPHIC SAFELIGHT
Filed Sept. 22, 1937

Earl M. Lowry
INVENTOR

Patented Sept. 5, 1939

2,172,249

UNITED STATES PATENT OFFICE 2,172,249

PHOTOGRAPHIC SAFELIGHT

Earl M. Lowry, Rochester, N. Y., assignor to Eastman Kodak Company, Rochester, N. Y., a corporation of New Jersey Application September 22, 1937, Serial No. 165,146

9 Claims. (Cl. 88—114)

This invention relates to photographic filters and safelights and particularly to safelights which absorb light of the longer wave lengths of the spectrum.

In handling photographic material which is sensitive to the red and infra-red regions of the spectrum, such as in spooling and packaging the film and in the processing operations after exposure, such as developing, it is necessary to work in a light which does not contain rays to which the material is sensitive. A filter or safelight which absorbs red and infra-red is desirable for this purpose.

Although light-absorbing glasses are known which absorb the red and infra-red rays of the spectrum, such material is not always suitable for photographic safelights since it is difficult to prepare and does not always absorb in the desired spectral regions. Glass manufacturers find it extremely troublesome to produce such glasses with satisfactory uniformity throughout a single melt and to repeat the absorption characteristics from one melt to another. Photographic safelights are ordinarily made of gelatin or cellulosic materials coated on glass or fixed between glass plates, the gelatin or cellulosic material having a filtering substance incorporated therein.

It is an object of the present invention to provide a method for the preparation of a photographic safelight which absorbs red and infra-red rays, by incorporation of a suitable filtering material in gelatin or colloidal substances. A further object is to provide a photographic safelight containing a material which absorbs red and infra-red rays and which does not crystallize or hydrolyze under the action of radiant energy.

These objects are accomplished by my invention by incorporating in gelatin or other colloidal material a metallic acetate dispersed by means of an alkanolamine stabilizer.

In the accompanying drawing

As the colloidal medium in which the filtering substances are incorporated, I prefer to use gelatin, although cellulose derivatives, such as cellulose acetate or synthetic resins, may also be used. The metal acetates which I contemplate using include cupric acetate and nickel acetate. These are incorporated in the colloidal medium by means of an ethanolamine stabilizer, such as diethanolamine, triethanolamine, propanolamine or tripropanolamine. The filtering layer is prepared by incorporating these materials in the colloidal medium in any suitable way, such as by preparing a solution of the acetate in water, adding it to a solution of alkanolamine in water and adding the combined solution to a suitable solution of the colloidal material, such as a solution of gelatin in water.

The preferred mode of preparing a filtering layer according to my invention is as follows:

A solution of cupric acetate is made up by dissolving 35 grams of cupric acetate in a solution of 15 grams of triethanolamine in 100 cc. of distilled water. This solution is then added to a gelatin solution containing 40 grams of gelatin in 200 cc. of distilled water. The total volume of the resulting solution is about 300 cc. This solution is coated on a suitable surface, such as on glass and allowed to dry. It may remain on the glass surface after drying or it may be removed and used on some other support, as a photographic filter or safelight.

Figure 1:
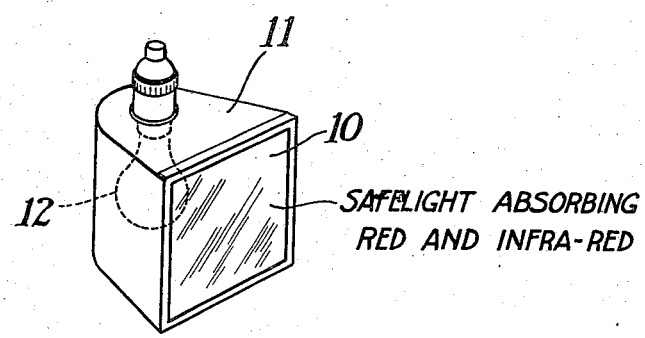
Fig. 1 is a plan view of a safelight made according to my invention.

In Fig. 1 of the accompanying drawing I have shown a safelight made according to my invention.

As shown in Fig. 1 the safelight consists of a glass plate 10 having a gelatin layer of the filtering material, made according to my invention, coated thereon. The plate 10 is fixed in an opening in a light-tight container 11 having an illuminating device, such as an electric lamp 12 therein. In use, any of the red or infra-red rays emitted by the lamp 12 are absorbed by the safelight 10.

Figure 2:
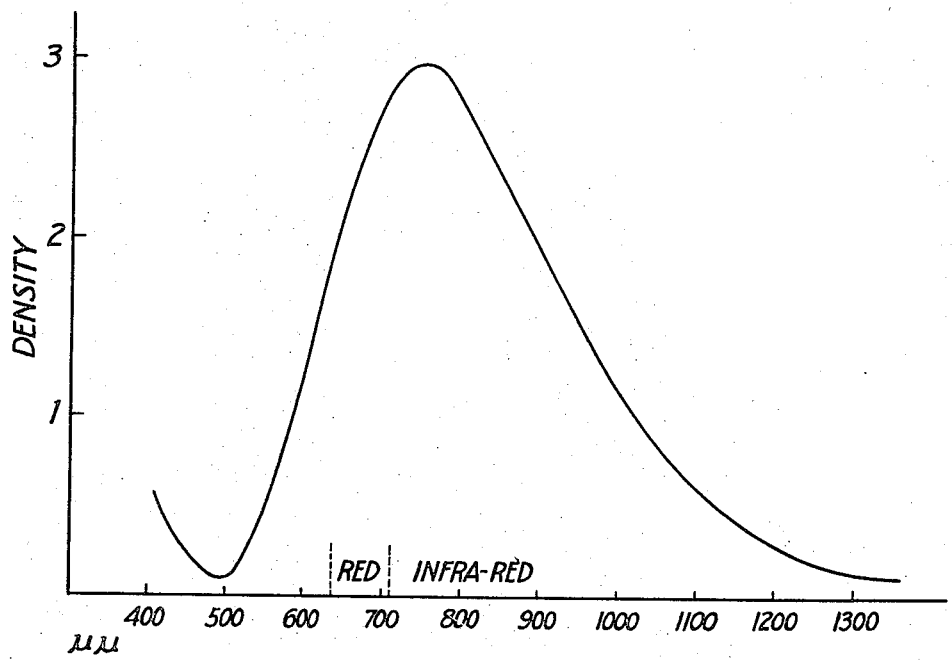
Fig. 2 is a graph showing the spectral absorption of a preferred modification of my safelight.

Fig. 2 of the drawing is a chart or graph indicating the spectral absorption of one type of light filter made according to my invention. The graph represents the spectral absorption of cupric acetate and triethanolamine in gelatin as described in the specific example above. As shown in the graph there is a region of minimum light absorption at approximately 500 millimicrons and the density increases rapidly with increase in wave length to a maximum absorption at about 750 millimicrons in the infra-red region. The graph shows that there is good light absorption in the red and throughout a large part of the infra-red region.

Although I have described a specific modification of my invention the amounts of the ingredients used may be varied within wide limits. More or less of the acetate may be used and the strength of the alkanolamine solution may be varied. In general, the density of the filter with respect to red and infra-red light may be increased by using more of the acetate in the gelatin solution.

However, if too great an amount of acetate is used the salt precipitates on cooling the solution. By changing the ratio of acetate to alkanolamine the region of maximum absorption may be shifted toward the red or toward the visible region of the spectrum.

The amount of cupric acetate may be varied from about 5 grams to about 40 grams per 100 cc. of 15% triethanolamine solution (added to about 40 grams of gelatin). If more than 40 grams of cupric acetate is used per 100 cc. of 15% triethanolamine solution there is a tendency for the acetate to precipitate. The amount of triethanolamine may also be varied, for example, 20 grams of cupric acetate may be added to 100 cc. of a 5%, 10% or 15% solution of triethanolamine in water (added to about 40 grams of gelatin). The amount of triethanolamine may be varied above or below these limits somewhat but too much triethanolamine tends to make the plates tacky, while too little triethanolamine results in an unstable solution.

When nickel acetate is used in place of cupric acetate in the filter, the amount necessary is approximately the same as the amount of cupric acetate described in the above formula.

It is to be understood that colloidal media, other than gelatin, may be used in the safelights according to my invention. Synthetic resins, for example, might be used. Metal acetates and alkanolamines other than those referred to might also be used. The examples included in the specification are given by way of illustration only.

The red and infra-red light absorbing filters made according to my invention are intended principally for use as photographic safelights, to absorb the red and infra-red rays emitted by illuminating devices. However, they may be put to other uses in the photographic field. For example, in printing color separation images onto color sensitive material, such as multi-layer film, it is sometimes desirable to print with substantially monochromatic light rays. Filters for absorbing the red and infra-red spectral regions made according to my invention may be used for this purpose, since they transmit light strongly in the green spectral region, but absorb red and infra-red rays. Filters made according to my invention may also be used in numerous other ways not herein specifically mentioned.

It is to be understood that my invention is to be taken as limited only by the scope of the appended claims.

I claim:

1. A light filter which absorbs red and infra-red light comprising a colloidal medium having dispersed therein an acetate selected from the group consisting of copper acetate and nickel acetate, and an ethanolamine.

2. A light filter which absorbs red and infra-red light comprising a colloidal medium having dispersed therein copper acetate and an ethanolamine.

3. A light filter which absorbs red and infra-red light, comprising a colloidal medium having dispersed therein nickel acetate and an ethanolamine.

4. A light filter which absorbs red and infra-red light, comprising gelatin having dispersed therein copper acetate and triethanolamine.

5. A light filter which absorbs red and infra-red light, comprising gelatin having dispersed therein nickel acetate and triethanolamine.

6. A light filter which absorbs red and infra-red light, comprising a gelatin layer having uniformly mixed therewith from about 11% to about 50% of cupric acetate, based on the weight of the gelatin, and from about 11% to about 27% of triethanolamine, based on the weight of the gelatin.

7. The method of making a filter for absorbing red and infra-red light, which comprises dispersing in gelatin an acetate selected from the group consisting of copper acetate and nickel acetate, and a stabilizing agent comprising an ethanolamine, coating the gelatin solution thus formed on a transparent support and drying the solution to form a rigid, light-absorbing medium.

8. The method of making a filter for absorbing red and infra-red light, which comprises dispersing in gelatin copper acetate and a stabilizing agent comprising triethanolamine, coating the gelatin solution thus formed on a transparent support and drying the solution to form a rigid-light-absorbing medium.

9. The method of making a filter for absorbing red and infra-red light, which comprises dispersing in gelatin nickel acetate and a stabilizing agent comprising triethanolamine, coating the gelatin solution thus formed on a transparent support and drying the solution to form a rigid-light-absorbing medium.

EARL M. LOWRY.